United States Patent [19]
Akkaway et al.

[11] Patent Number: 5,976,598
[45] Date of Patent: Nov. 2, 1999

[54] PHYSICALLY COATED CELLULOSE AS LOW CALORIE FLOUR REPLACEMENTS

[75] Inventors: Daniel Akkaway, Parsippany, N.J.; Denise Deming, Urbana, Ill.; Lawrence Klemann, Annandale, N.J.; Juan A. Menijvar, Denville, N.J.; Louise Slade, Morris Plains, N.J.; Ronald D'Amelia, Hicksville, N.J.; Jeffery T. Galbraith, Bloomingdale, N.J.; Haresh P. Madera, Bloomfield, N.J.; Robert M. Sauer, Jr., West Milford, N.J.; Ronald G. Yarger, Madison, N.J.; Xiaoming You, Morris Plains, N.J.

[73] Assignee: Nabisco, Inc., Parsippany, N.J.

[21] Appl. No.: 08/964,070

[22] Filed: Nov. 4, 1997

[51] Int. Cl.$^6$ ...................................................... A21D 2/10
[52] U.S. Cl. ............................ 426/496; 426/89; 426/103; 426/549; 426/653; 426/661; 426/658; 426/804; 536/56; 536/63; 536/64; 536/65
[58] Field of Search .............................. 426/89, 103, 549, 426/653, 658, 661, 442, 443, 496, 804, 634; 536/63, 64, 65, 66, 56

[56] References Cited

U.S. PATENT DOCUMENTS

| | | | |
|---|---|---|---|
| 3,023,104 | 2/1962 | Battista | 426/549 |
| 3,676,150 | 7/1972 | Glicksman et al. | 99/90 |
| 3,766,165 | 10/1973 | Reinhard | 260/209 |
| 4,219,580 | 8/1980 | Torres | 426/549 |
| 4,247,568 | 1/1981 | Carrington et al. | 426/321 |
| 4,461,782 | 7/1984 | Robbins et al. | 426/549 |
| 4,774,099 | 9/1988 | Feeney et al. | 426/552 |
| 4,950,140 | 8/1990 | Pflaumer et al. | 424/439 |
| 5,073,387 | 12/1991 | Whistler | 426/52 |
| 5,356,644 | 10/1994 | Hendrick et al. | 426/99 |
| 5,668,273 | 9/1997 | Allen et al. | 536/66 |

*Primary Examiner*—Milton Cano
*Attorney, Agent, or Firm*—St. Onge Steward Johnston & Reens LLC

[57] ABSTRACT

Particulate cellulosic material such as microcrystalline cellulose, α-cellulose, and/or cellulose acylated with $C_2$ to $C_{24}$ aliphatic acids to a degree of substitution of about 0.05 or less, and mixtures thereof, are physically coated with an edible hydrophobic polymer to provide low calorie flour/starch replacements for edible compositions. Typical coating polymers include cellulose esters of one or more $C_2$ to $C_{24}$ aliphatic acids; cellulose ethers such as methyl cellulose, ethyl cellulose, hydroxypropyl methyl cellulose, carboxymethyl cellulose, natural waxes such as carnauba wax, candelilla wax, rice bran wax, bees wax, and mixtures of these; petroleum waxes such as polyethylene and paraffin waxes; proteins, preferably hydrophobic, such as zein, glutenin and the like, and mixtures thereof. In preferred embodiments, the low calorie flour replacements are made in a hot melt process with intense mixing in the absence of emulsifiers and gums. Some embodiments of the invention are particularly useful as low calorie flour replacements for baked products such as cookies.

36 Claims, 8 Drawing Sheets

PHYSICALLY COATED CELLULOSE AS LOW CALORIE FLOUR REPLACEMENTS

TECHNICAL FIELD

This invention relates to cellulose that has been physically coated and is useful as a full or partial flour or starch replacement in food products.

Weight reduction and maintenance of a desirable weight are concerns of many people in contemporary society. There is an increasing interest in low calorie food products. Many such foods have been formulated to provide calorie reduction by substituting artificial sweeteners for sucrose and/or fat mimetics for the fat component, or reducing the fat content. Since carbohydrates, especially starches, are a significant component of many baked goods and other foods, it would also be advantageous to produce low calorie starch replacements that would have the functional qualities of starch but not its caloric value. Such ingredients could then be employed in cookies, sweet rolls, doughnuts, crackers, pastries, breads, cakes and cake mixes, snacks, and the like, which are favorites in the diets of those who often struggle to maintain or reduce their present weight.

Cellulose is a ubiquitous fiber found in all plant sources, including algae, bacteria, and fungi. Cellulose is a polysaccharide composed of 1,4-linked glucose units that are negligibly digestible. Because of this, it would appear that cellulose should be a good low calorie replacement for starch, but attempts to use it as an ingredient in food products have been less than successful. Despite its plethora of hydroxyl groups, it is intrinsically insoluble in water. This feature is ascribed to the cooperative cohesion of its chain segments in its crystalline domains. It is generally accepted that cellulose is composed of a stable two-phase structure of crystalline and non-crystalline domains. Though water-insoluble, it can absorb several times its weight in water, a characteristic that does not render cellulose a desirable low calorie food ingredient for baked goods since considerable energy must be expended to remove the water, and baking problems are created. This property can also have the effect of tying up water otherwise needed for other functional ingredients. The property of water insolubility also creates difficulties in forming dispersions in some food formulations.

BACKGROUND OF THE INVENTION

A number of flour replacements, low calorie flours, and flour extenders have been suggested to mimic the appearance, taste, mouthfeel, and other organoleptic qualities of flour in food products containing it, while simultaneously providing the functional characteristics for dough handling, baking, and the like provided by conventional flour.

For example, low calorie flour for yeast-leavened baked products was suggested by Glicksman, et al., in 1972 (U.S. Pat. No. 3,676,150). The patent suggested that a correct proportion of α-cellulose, starch, and a hydrophilic gum, particularly a cellulosic gum, could behave like a bread flour when used in a dough, i.e., the composition formed a sponge system that was plastic and exhibited gluten network-like characteristics. The text of the specification disclosed a composition comprising 30% to 70% α-cellulose and 30% to 70% starch with 1% to 10% gum, but the two examples illustrated narrower ranges of nearly equal α-cellulose:starch weight percent ratios (41:55 and 47.9:47.4) and gum concentrations of 3% and 4.7%.

A year later Rennhard suggested that polysaccharides, particularly polyglucose or polymaltose, might serve as a non-nutritive substitute for flour, though the compounds were also suggested for other uses, e.g., bulking agents for food products containing artificial sugar and fat replacements (U.S. Pat. No. 3,766,165). In preferred embodiments set out in the disclosure, glucose or maltose were polymerized in an anhydrous melt in the presence of an organic acid catalyst, and the oligosaccharide formed was then ground or mechanically subdivided to produce a flour-like consistency. Though polydextrose produced according to the invention occasionally exhibited acidic or sour off-flavors depending upon the amount of entrained or chemically bound residual catalyst remaining after condensation of the sugar residues, that problem was addressed in subsequent patents, and polydextrose prepared with organic acid catalysis became widely used as a bulking agent. Hendrick and Reimer suggested in a later patent (U.S. Pat. No. 5,356,644) that polydextrose and many other materials (including air and microcrystalline cellulose) might be employed as inner cores to be coated with a fat material for use as a low calorie fat substitute.

In 1977, Torres suggested that a modified polydextrose polymerized in the presence of a polyol in addition to dextrose provided a crosslinked product that could be mixed with α-cellulose and/or microcrystalline cellulose and flour to provide a farinaceous food composition that could be used in pastas and baked goods. Broadly speaking, his disclosed composition contained 20% to 75% modified polydextrose, 10% to 40% cellulose, and 5% to 20% flour. It was generally prepared by adding cellulose and flour to an aqueous solution of modified polydextrose and then drying the mixture using conventional methods.

Torres went on to disclose another flour substitute three years later in U.S. Pat. No. 4,219,580. This comprised purified plant cellulose such as crystalline α-cellulose or microcrystalline cellulose and/or non-digestible modified starch such as acid-or enzymatically-hydrolyzed starch combined with xanthan gum, and an emulsifier such as lecithin. Except for the emulsifier and gum choice, the composition resembled that described by Glicksman, et al., summarized above. This Torres flour substitute was prepared by first heating the emulsifier and thoroughly admixing it with the gum. The cellulose and/or starch was then added and the resultant mixture, blended until a homogeneous, free-flowing powder was obtained.

Non-digestible food carbohydrate and/or fat replacements prepared from starch were disclosed by Carrington and Halek the following year (U.S. Pat. No. 4,247,568). These were made by heating starch in the presence of di-or tri-carboxylic acids under reduced pressure. Products that were substantially insoluble were suggested as flour substitutes for baked products and pasta.

Low calorie baked products containing a non-digestible liquid polyol polyester such as sucrose polyester were disclosed by Robbins and Rodriguez in U.S. Pat. No. 4,461,782 in 1984. The starch component comprised from about 25% to about 85% microcrystalline cellulose or a mixture of microcrystalline cellulose and flour in a weight ratio of at least 1:1. An anti-anal leakage agent was added to the food recipes to prevent the objectionable gastrointestinal side effects of the synthetic fat ingredient.

From about 0.1% to about 10% cellulosic fiber, defined as including cellulose as well as modified cellulosic material including man-made fibers, were disclosed as a brownie ingredient in U.S. Pat. No. 4,774,099 to Feeney, et al. (1988). The recipe, which included other more conventional ingredients such as sugar, flour, shortening, and cocoa, was intended to provide superior moisture retention and texture of the brownies, but it also increased bar cookie height, and enhanced chocolate flavor intensity and tolerance to underbaking. To achieve the benefits of the invention, the cellulosic fiber was processed either by prehydration or co-milling with sugar prior to use in the formulation.

In a statutory invention registration in the early 1990's, Sloan disclosed that a dry blend of randomly-bonded polysaccharide and a cold-water-gelling granular starch was useful as a carbohydrate (and/or fat) replacement (H937). Flour, however, was the major component suggested for the bakery products of the invention. Premixes were also discussed.

About the same time, several other patents described even more specialized ingredients as flour substitutes or extenders. For example, Pflaumer, et al., disclosed that cookie recipes containing psyllium in partial replacement of flour were beneficial for gastrointestinal disorders and reduction of blood cholesterol levels (U.S. Pat. No. 4,9569,140). Cellulose hydrolysates of tamarind endosperm polysaccharides were disclosed as producing oligosaccharides that could be used as a substitute for the metabolizable carbohydrate components of processed foods in U.S. Pat. No. 5,073,387 to Whistler.

It would be desirable to have other low calorie flour substitutes, especially with attributes enabling their use in substitution of flour in baked products with relatively low moisture contents such as crackers and cookies suitable for mass distribution.

DISCLOSURE OF THE INVENTION

It is an object of the invention to provide a low calorie flour replacement for food products that functions like flour in conventional recipes.

It is another and more specific object of the invention to provide a method for enabling the use of nondigestible cellulose in compositions useful as a flour/starch replacement in edible compositions.

It is yet another and more specific object of the invention to provide low calorie flour substitutes with attributes enabling use in place of flour or bulking agent in baked products with relatively low moisture contents such as crackers and cookies suitable for mass distribution.

These and other objects are accomplished according to the invention by providing processes for making, compositions containing, and methods for using cellulosic materials that have been physically provided with a hydrophobic sheath to provide a powdered product useful in as a low calorie flour/starch replacement for different edible compositions, particularly food products such as baked goods.

The invention provides low calorie flour replacement compositions comprising particulate cellulosic materials, and mixtures thereof, which have been physically coated with an edible hydrophobic polymer. Exemplary of cellulosic materials are microcrystalline cellulose, α-cellulose, and methylcellulose, cellulose acylated with $C_2$ to $C_{24}$ aliphatic acids to a degree of substitution of about 0.05 or less, milled flour, wheat starch, oat fiber, bran (e.g., from rice, wheat, barley, oats, corn, legumes such as beans and peas, and the like) grain milling fractions high in cellulose, and the like, and mixtures thereof. Exemplary hydrophobic polymers include cellulose esters including those of $C_2$ to $C_{24}$ aliphatic acids; cellulose ethers such as methyl cellulose, ethyl cellulose, hydroxypropyl methyl cellulose, natural waxes such as carnauba wax, candelilla wax, rice bran wax, bees wax, and mixtures of these; petroleum waxes such as polyethylene and paraffin waxes; proteins, preferably hydrophobic, such as zein, glutenin and the like, and mixtures thereof. For use in flour replacements for bakery products, some preferred polymers have a flow point of at least about 50° C., preferably from about 75° to about 180° C., e.g., 110° to 120° C. As used herein, the term "flow" means that the material is liquid or otherwise exhibits a suitable consistency to enable coating under the conditions of processing.

Flour replacements of the invention are typically made by rendering the polymer flowable (e.g., by heating or with a solvent), mixing the polymer with the cellulosic material, and then blending and/or agitating for a time under conditions sufficient to physically coat the polymers in the absence of emulsifiers and gums. The product is then cooled. If solvents are employed in the process, these may be evaporated during and/or after coating, and the product may be dried as it is formulated. Agglomerated products may be milled after drying.

The invention correspondingly provides methods of reducing calories in food products having a carbohydrate component by using the physically coated cellulose of the invention in full or partial replacement of the carbohydrate component. In preferred embodiments, a starch calorie reduction of at least about 25% is achieved.

The following description describes several preferred aspects of the invention.

BEST MODES FOR CARRYING OUT THE INVENTION

Figure 1:
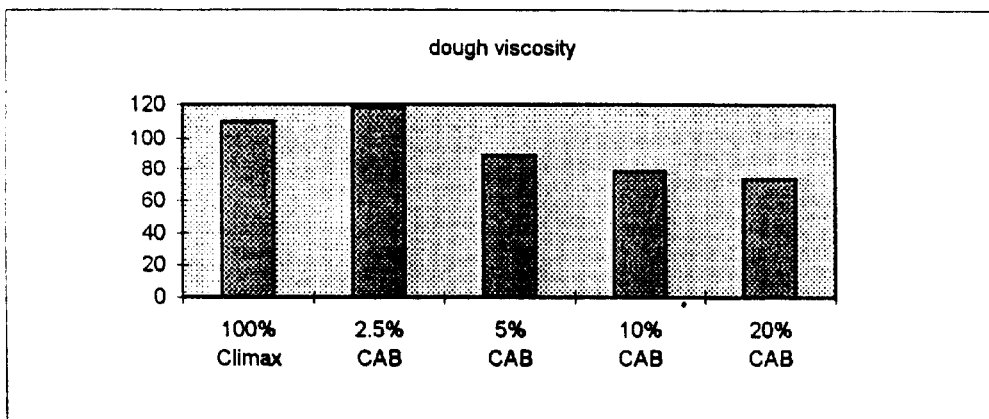
FIG. 1 is a bar graph presenting data related to dough viscosity, cookie geometry, and final product moisture content observed in cookies made with cellulose acetate butyrate used in partial replacement of the flour component of the recipe compared to control cookies made using Climax® flour.
Figure 1:
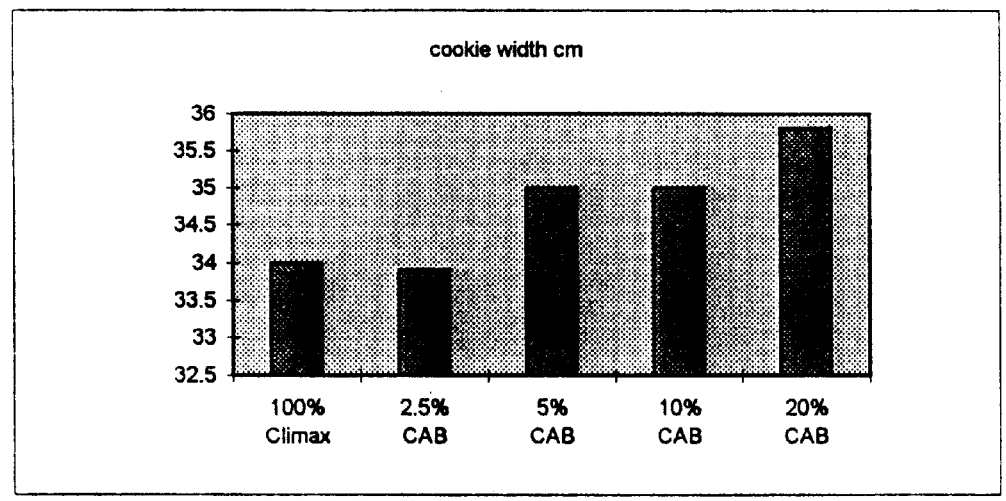
Figure 1:
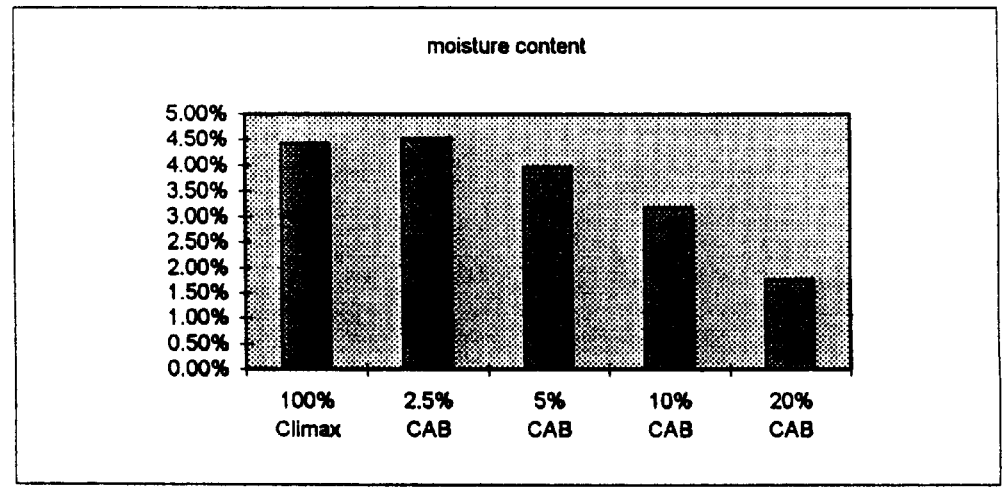

This invention is based upon the finding that cellulose may be physically coated with edible hydrophobic polymeric materials to produce a product having functional characteristics, but not the calories, of flour.

In the practice of the invention, particulate cellulosic material is physically coated with an edible hydrophobic polymer in amounts and under conditions that provide a less hydrophilic material so that the overall composition is rendered hydrophobic and mimics flour. In typical embodiments, particulate cellulosic material is mixed with fluid polymer, the mixture is intensely blended until the particles are coated, and the polymer is solidified. It is an advantage of the invention that the coating can be carried out in the absence of emulsifiers and gums. Where emulsifiers and/or gums are employed, they will be maintained at minor levels which do not adversely affect the properties of either the flour substitute or of the product made employing it. Where solvents are employed to help render the polymer flowable to facilitate coating at ambient or elevated temperature, they are removed during and/or after the coating process. The product formed may be milled after coating in some embodiments.

By "particulate cellulosic material" is meant any edible nondigestible or substantially nondigestible particulate cellulosic material, including microcrystalline cellulose such as that marketed under the name Avicel®, α-cellulose such as that marketed under the names Solka Floc® or International Filler, e.g., BH300™, methylcellulose, cellulose acylated with $C_2$ to $C_{24}$ aliphatic acids to a degree of substitution of about 0.05 or less (hereafter referred to as "surface-modified cellulose"), milled flour, wheat starch, oat fiber, bran (e.g., from rice, wheat, barley, oats, corn, legumes such as beans and peas, and the like) grain milling fractions high in cellulose, and the like, and mixtures thereof. Powdered cellulose products are preferred. Microcrystalline cellulose, α-cellulose, surface-modified cellulose, and mixtures thereof are particularly preferred. As used herein, in descriptions of physically coated cellulosic material, the term "cellulose" is used to encompass all the above-described materials. It is an advantage of the invention that the choice of cellulosic material and particle size can be employed to modulate the properties of the final flour replacement product for different purposes.

The above-noted "surface-modified cellulose" is described in detail in commonly-owned, U.S. Patent Application No. (attorney's docket no. NBI-825, entitled "Surface-Modified Cellulose as Low Calorie Flour Replacers", filed in the names of Lawrence P. Klemann, Ronald G. Yarger, and Xiaoming You, concurrently herewith. As summarized above, flour/starch replacements for edible compositions are prepared by coating particulate cellulosic materials with edible hydrophobic polymers. Any edible hydrophobic polymer or polymer mixture that can function to coat cellulose particles without the use of gums or other adherent materials can be employed. Briefly, that application discloses cellulose surface-modified with fatty acids that are useful as full or partial flour or starch replacements in food products. That disclosure enables the production of edible surface-modified cellulose compositions containing cellulose and from 1 to 10% $C_2$ to $C_{24}$, in some embodiments primarily $C_6$ or $C_8$ to $C_{22}$, or more narrowly $C_{16}$ to $C_{20}$, aliphatic acids. In one embodiment, at least about 50% of the cellulose is acylated with the acid such that it exhibits a degree of substitution of about 0.05 or less, preferably 0.01 or less. The disclosure is incorporated herein by reference in its entirety.

By the term "hydrophobic polymer" is meant any polymer capable of rendering the cellulosic substrate less hydrophilic, preferably by at least 50%. One way to evaluate and objectively indicate hydophobicity, is to add 0.2 grams of the flour substitute to 20 mL of water and note the percentage by weight that remain floating after holding for 5 minutes with shaking at 1 minute intervals. When expressed this way, a preferred degree of hydophobicity calls for at least 90% to remain floating.

In many embodiments, polymers are selected to have a flow point sufficiently low to avoid the risk of burning the cellulosic substrate. The flow/melt properties of the polymer are also selected to being sufficiently high to provide an economical coating process yet sufficiently high to withstand food-processing conditions to which the flour replacement product will be subjected. In the case of baked goods, some preferred embodiments, for example, employ one or more coatings of a polymer or polymer mixture, e.g., preferred polymers have a flow point of at least about 50° C., preferably from about 75° to about 180° C., e.g., 110° to 120° C. These polymers include, but are not limited to, cellulose esters such as those of $C_2$ to $C_{24}$ aliphatic acids; cellulose ethers such as methyl cellulose, ethyl cellulose, hydroxypropyl methyl cellulose; natural waxes such as carnauba wax, candelilla wax, rice bran wax, bees wax, and mixtures of these; petroleum waxes such as polyethylene and paraffin waxes; proteins, preferably hydrophobic, such as zein, glutenin and the like, and mixtures thereof. Representative cellulose esters within the above group are cellulose acetate, cellulose propionate, cellulose butyrate, cellulose caproate, cellulose caprylate, cellulose stearate, cellulose oleate, cellulose acetate butyrate, and mixtures thereof. As illustrated hereafter, hydroxypropyl methylcellulose and cellulose acetate butyrate are preferred coatings in some embodiments.

It is an advantage of the invention that variation in the hydrophobic polymeric coating materials and processing conditions can be used to modify the properties of the flour replacement produced when cellulose is coated to provide a variety of products for different uses. The molecular weight, coating level, evaporation time, number and composition of coatings, and the like parameters can be manipulated to provide flour replacements exhibiting different properties for use in different products. Examples are given hereafter. Many embodiments employ coating levels of from about 5% to about 20% by weight.

In a typical process, cellulose is added to fluid (i.e., rendered flowable by heating and/or solvent addition) polymer or fed together into blending/heating equipment at a concentration of, for example, 2% to 30% of the weight of the cellulosic substrate. Heat softens the polymer, preferably to the extent that it flows in the mixing device intended, and mixing coats the fluid polymer onto the surface of the powdered cellulose without the use of gums. A high-speed shear mixer for coating is preferred for coating cellulose according to the practice of the invention, such as, for example, a Turbulizer® or Solidaire®. Solvents are not required, but can be employed in some embodiments. If employed, solvents may be removed during and/or after the coating process. Agglomerates are preferably avoided by suitable selection of processing equipment and conditions. For example, the mixture of cellulose and coating polymer can be exhausted directly into a pneumatic conveyor such that the polymer cools or otherwise solidifies before sticking of particles can occur. Should the coated cellulose clump or agglomerate, it may be ground or milled prior to use in a food composition using conventional means, e.g., by use of a Pulvocron®, Disintegrator®, Jet® mill, or the like to provide a powdered, flour-like final product.

Figure 8:
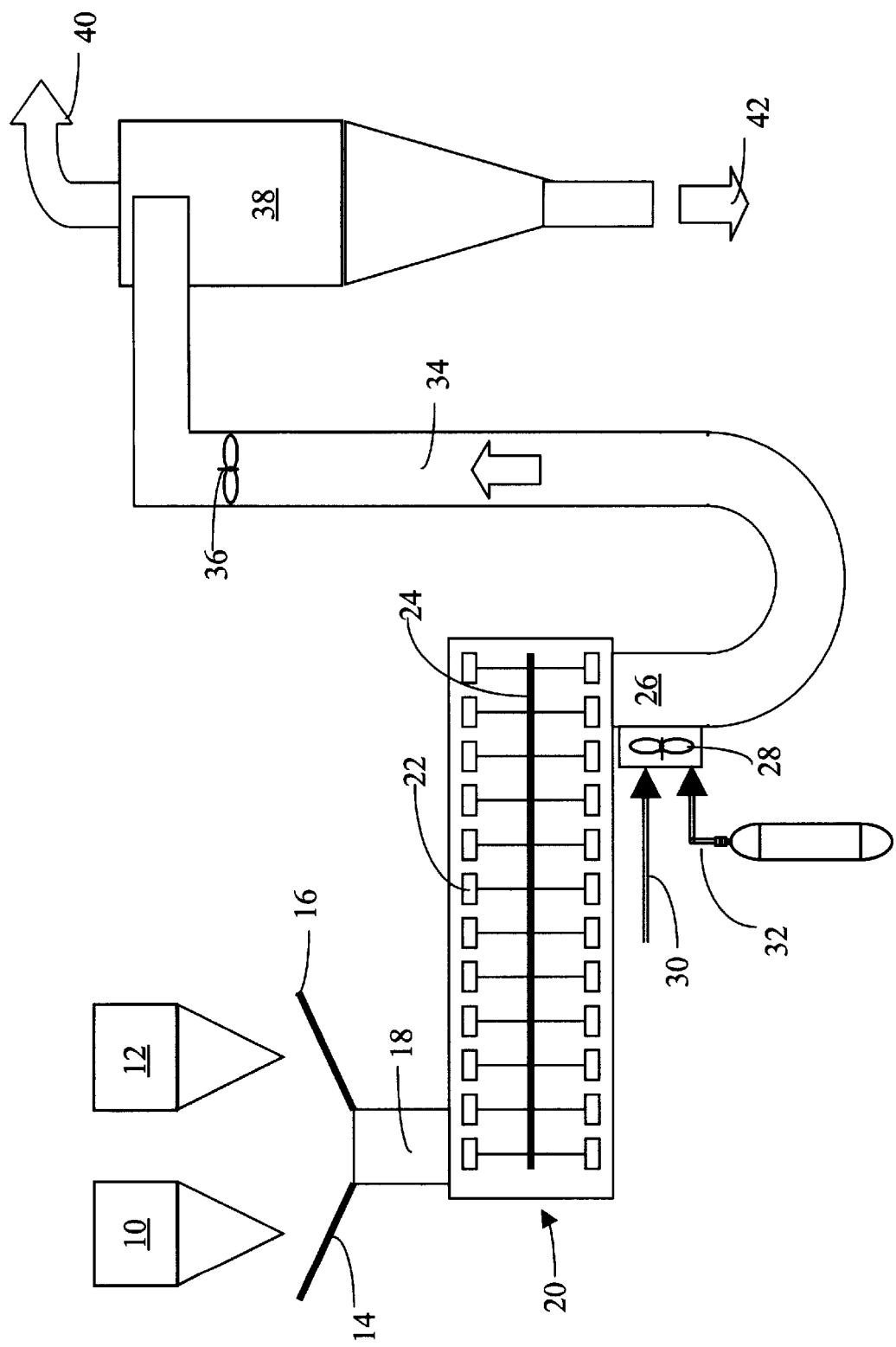
FIG. 8 is a schematic diagram showing one preferred process scheme.

FIG. 8 shows one preferred process scheme according to the invention. Hopper 10 holds a suitable cellulosic substrate and like hopper 12 holds solid polymer for coating. The hoppers discharge their contents onto conveyors or chutes 14 and 16, respectively for transfer via feed tube 18 to a suitable heated mixing device 20. The materials are fed from left to right in the drawing by a plurality of paddles 22 rotated about shaft 24. The mixing device is heated to a suitable temperature, e.g., about 250°, to enable heating the polymer to above its flow temperature without burning the cellulose. The rapid rotation, e.g., about 4000 rpm, of the paddles causes intense mixing and coating such that the material is discharged, coated at 26 at a temperature desired for the material, e.g., about 180° C. in one case for polyethylene. If desired more than one mixing device can be employed in series. Fan 28 introduces air at line 30 and nitrogen gas at line 32 to advance the powdered, coated material through conduit 34, aided by fan 36, to cyclone 38. The cyclone separates the materials into a fines stream 40 and a product stream 42. If desired, the product can be ground or otherwise reduced in particle size or classified.

In preferred embodiments, heat and intense mixing together provide a hot melt coating process that obviates the need for emulsifiers. Thus, preferred processes of the invention are economical in their use of reagents. In some baking embodiments involving cookies, it was also found that products baked faster, thus also increasing the cost effectiveness of preferred processes of the invention.

Coated cellulose of the invention is employed to replace all or part of the starch component of any edible composition, particularly food products, which have a carbohydrate component, including all-purpose or unbleached wheat flour (strong or weak), rye, potato, corn, rice or other cereal flours, and starches such as cornstarch, oats, nut meals, and mixtures thereof. Coated cellulose of the invention can be employed as the full or partial starch replacement for all types of leavened baked products, both yeast-raised and chemically leavened, and unleavened baked products, and as coatings or coating ingredients for the same types of products. Coated cellulose products of the invention are also useful in snack food products, cereal products, and products containing starch as a thickener.

Representative of starch-containing food products which can contain, in addition to other food ingredients, coated cellulose of the invention in full or partial replacement of the starch component are pancakes, breakfast cereal, snack foods (such as salty snacks like chips, puffed products, pretzels, and the like), pasta, pet foods, frozen novelties, dairy products, meat products, egg products and substitutes, nut products, candies, puddings and pies, liquid and dried coffee lighteners, gravies, and bakery products (e.g., cookies, cakes, breads, rolls, waffles, croissants, doughnuts, pastries), biscuits, savory crackers, and pizza, and mixes and premixes for any of these. Coated cellulose products of the invention are particularly efficacious in food products having a significant starch component.

The invention has particular application to cookies, cracker and biscuits baked to a crisp texture. Typically, a cookie will be prepared from dough made from a mixture of sugar, shortening and flour in reasonable proportions, also including water or other water-containing ingredient. A biscuit and or cracker will be similar in formulation, but some crackers and some biscuits are leavened by yeast and often contain lower amounts of sugars. Crisp is a term having a known meaning to skilled bakers and has been objectively defined, for example U.S. Pat. No. 4,374,862, the description and procedure of which are incorporated herein by reference. These products will typically have moisture contents of less than 5% and water activity values of less than 0.65.

Coated cellulose of the invention is especially useful as a starch replacement in bakery goods such as in cookie and cake recipes. By the term "cookie" is meant any of a variety of small cakes, usually flat or slightly raised, that are prepared by rolling and cutting, dropping, or shaping dough and then baking it, or by cutting dough into pieces after baking. A cake is any baked product made from a sweetened dough or batter, including conventional types containing flour and other ingredients, leavened with yeast, baking powder, or beaten egg whites, and, optionally, iced. Both cakes and cookies typically contain flour, water, sugar, and shortening in reasonable proportions, and can have the flour or other starch component reduced by using the coated cellulose of the invention.

It is an advantage of the invention that coated cellulose is essentially nondigestible, preferably delivering less than 0.5 kcal/gram. Lesser caloric reductions might be desired for some products due to cost and functionality considerations. In preferred embodiments, the coated cellulose products are used in carbohydrate-containing food products in amounts sufficient to produce at least about a 25% reduction in calories from the carbohydrate component. Thus, in recipes, it is typically used to replace from about 25% to 100% of the carbohydrate component. In some embodiments, at least about 25% to about 50% of the carbohydrate component is replaced by coated cellulose of the invention.

The low calorie carbohydrate ingredient of the invention can be employed with other low calorie ingredients such as artificial sweeteners and/or fat substitutes to further reduce the overall caloric content of food products such as cookies. Coated cellulose of the invention, for example, can be employed in compositions with natural or artificial sweeteners, or mixtures thereof. Natural sweeteners include, but are not limited to, sugar (sucrose), glucose, fructose, and maltose. Artificial sweeteners include, but are not limited to, 1-aspartyl-1-phenylalanine methyl ester (commercially available as aspartame or Nutri-Sweet®), saccharine, cyclamate, the potassium salt of 6-methyl-3,4-dihydro-1,2, 3oxathiazin-4-one-2,2-dioxide (commercially available as acesulfame-K®), or a mixture of these.

If an artificial sweetener is used, it is generally present in much smaller amounts due to the higher sweetening potency and intensity of most artificial sweeteners (which can be up to 50,000 times as sweet as sugar). In this case, at least 10% by weight of a bulking agent is typically included in inventive composition in order to insure that the texture, form and other characteristics of a conventional food product are maintained. Typical bulking agents which are suitable for use in these instances should advantageously contribute no or little taste to the product and are preferably carbohydrates, most preferably at least partially if not wholly nondigestible. Exemplary of such bulking agents are polydextrose, isomalt (commercially availalbe as Palatinit®), isomaltulose (commercially available as Palatinose®), polyglucose, polymaltose, carboxymethyl-cellulose, microcrystalline cellulose, cellulose gel, arabinogalactan, fructooligosaccharide (available as Nutraflora® and Raftilose P95®), galactooligosaccharide, glucooligosaccharide, 4-O-(β-galactosyl)-D-sorbitol (available as Lactitol®), polyethylene glycol, and D-mannitol, as well as mixtures or combinations of any of these. However, it is an advantage of the invention that coated cellulose itself can act as a bulking agent, so that the amount of other bulking agent needed in some recipes can be reduced.

Where coated celluloses are employed as starch replacements in recipes containing an artificial sweetener and a bulking agent or other spreading ingredient, it is an advantage of the invention that cookie geometry may be manipulated by use of the flour replacement. By "cookie spread" is meant the horizontal movement in the cookie dough mass as it is subjected to oven baking conditions. By "stack height" is meant the vertical movement of the cookie dough mass during baking. As can be seen from the data presented hereafter, flour replacements of the invention can increase cookie spread in some embodiments, as compared to the use of unmodified bulking agent.

It is another advantage that coated cellulose of the invention not only exhibit substantially no calories, but also exhibit the proper texture for use as a flour. While not wishing to be bound to any theory, it appears that the physical deposition of hydrophobic polymer on the surface of the cellulose particles provides them with a sheath that renders the cellulose less hydrophilic or by physically constraining its ability to swell. The existence of either or both of these properties makes the coated cellulose especially advantageous for baking purposes. Coated cellulose is preferably powdered and resists formation of aggregates during processing to form the food products, thus protecting against a gritty mouthfeel.

Coated cellulose can not only be employed in recipes containing full calorie shortenings or other fats or oils, but, as mentioned above, it can also be used in reduced fat recipes, and in recipes containing fat substitutes. Fat substitutes include any heretofore suggested, including, but not limited to, triglycerides tailored to have fatty acid constituents providing a lower caloric density than typical fats (e.g., caprinin and salatrim), sugar esters, neoalkyl esters, polyglycerol esters, malonate esters, propoxylated glycerols, retrofats, carboxy/carboxylates, polyvinyl alcohol esters, and the like.

For typical cookies, the dough is formulated by combining the starch component and mixing it into a creamed shortening component for a period of time sufficient to provide a uniform blend, and then optional flavorings and/or particulates may be added. Sufficient aqueous components may, optionally, also be added under conditions effective to provide the consistency typically desired for shaping and forming conventional doughs, e.g., sufficient to make a dough that has a viscosity appropriate for further processing by dropping, sheeting and/or cutting. On completion of the dough preparation, the dough is typically pressed into baking pans, or fed to equipment wherein it is divided into suitably sized portions and/or sheeted to the size required, and deposited on suitable baking surfaces for holding the portions in an oven of suitable design. It is an advantage of the invention that typical cookie forming methods and equipment, such as those involving rotary molding, wire cut, and extrusion, cookie equipment can be employed. Baking surfaces can comprise metal bands or mesh, but can also comprise ceramic, glass, paper, and/or plastic.

It has been found that changing the order of ingredient addition can be used in the practice of some embodiments of the invention to control the geometry and/or texture of cookies containing coated cellulose. For example, in some embodiments, coated cellulose is first mixed with the shortening ingredient, and then the admixture is blended with the other dry ingredients, aqueous ingredients, flavorings, and/or particulates. It is another advantage of the invention that the rheology and baking time can also be controlled according to the invention.

EXAMPLES

The following examples are presented to further illustrate and explain the present invention and should not be taken as limiting in any regard. Unless otherwise indicated, all parts and percentages are by weight, and are based on the weight at the particular stage of the processing being described. Dough viscosities are measured using a TA-XT$_2$ texture analyzer. Product moisture contents are determined by measuring the weight loss during baking. Cookie geometry (width, length, and height) are measured using a micrometer, and represent the average of at least 4 measurements.

Example 1

This example illustrates changes in the physical properties of cellulose when it is coated with a cellulose ester, cellulose acetate.

Cellulose acetate (Aldrich #18,095-5: 40 g, 39.8% acetate by weight) was dissolved in 400 mL propyl acetate in a Hobart mixer. To this was added 200 g of cellulose (Solka Flok® 300), and the mixture was placed under a hood, with continued mixing, until all propyl acetate had evaporated.

When 0.5 g of this was placed into a small beaker containing 20 mL water, it did not appear to "wet" or absorb water as did cellulose itself. A significant portion of the powder floated on top of the water, unlike cellulose, which either settled or remained suspended in the water.

Example 2

In this example, cellulose is coated with polyethylene (PE).

Cellulose and PE were fed together at 200 lb./hour and 40 lb./hour, respectively, into a Turbulizer® mixer which is heated to about 30° C. higher than the liquefying temperature of the polymer (i.e., heated here to 150° C.). The mixer is operated at high speed (4000 rpm) to ensure the mixing of the polymer and cellulose. The discharge port of the mixer is connected to a Pulvocron mill for grinding the powder as it is discharged from the mixer. The product is in the form of a fine powder which is conveyed by air to a bag house for collection. The whole process is continuous with a residence time of about 0.5 minutes or less.

Example 3

Cookies utilizing physically coated cellulose of Example 2 in partial replacement of the flour ingredient were made and compared with cookies using International Filler α-cellulose and commercially available Climax® flour in this example.

Cookie Preparation. The cookies for this and subsequent examples were made using the following recipe:
Stage 1. NFDM (nonfat dry milk powder) 2.25 g
  salt 2.81 g
  soda (sodium bicarbonate) 2.25 g
  FGS (finely granulated sucrose) 94.5 g
  fat (all vegetable shortening) 90.0 g Stage 2. ammonium carbonate (ABC) 1.13 g
  HFCS (high fructose corn syrup 3.38 g
  water 49.5 g
Stage 3. flour or flour replacement blend 225.0 g Mixing Procedure. In stage 1, some of the dry ingredients (NFDM, salt, soda, FGS) are blended, added to the fat, and mixed at low speed for three minutes in a Hobart mixer, scraping the bowl sides and paddle after each minute of mixing. In stage 2, ABC is dissolved in water, and the solution is added to HFCS. The total solution is added to the stage 1 blend, and the ingredients are blended at low speed, scraping the bowl and paddle each 30 seconds. The speed is then increased to medium for two minutes, again with bowl and paddle scraping after each 30 seconds. In stage 3, the flour or flour substitute blend is added to the stage 2 mixture and folded in 3 times before mixing 2 minutes at low speed, scraping the bowl and paddle after each 30 seconds.

Baking Procedure. Preheat oven to 400° F., and record the weight of the cookie sheet (cold and hot). Portion four 60 g pieces of dough with minimum deformation and place on the cookie sheet. Lay a rolling pin across the gauge bars of the sheet, allowing the weight of the pin to compress the dough pieces without additional compressive force. Roll the dough only once. Cut the cookies with a 60 mm cutter, carefully lifting up the scrap dough with a small spatula. Lift cutter straight up from the dough. Record the weight of the dough blanks and cookie sheet. Bake at 400° F. for the prescribed bake time (typically 10.5 minutes). Weigh the cookie sheet with the cookies immediately upon removal from the oven and carefully remove the cookies with a flat spatula. The standard baking time is defined as the time required to produce a weight loss of 13.58% during baking of the control formulation in a preheated oven at 400° F. The standard bake time is maintained constant for subsequent baking tests to evaluate the effect of the flour replacer on baking performance and finished product quality.

Baking Results. The physically coated cellulose flour replacers of the invention tested included 5%, 10%, and 20% CAB-coated cellulose (based on the weight of the cellulose, and denominated 5% CAB, 10% CAB, and 20% CAB, respectively), 5%, 10%, and 20% polyethylene (PE)-coated cellulose (based on the weight of the cellulose, and denominated 5% PE, 10% PE, and 20% PE, respectively), and ground 20% PE-coated cellulose prepared as described in Example 2 above. All flour replacers, except for Climax®, were used at a 25% level, based on the weight of the flour. Climax® was employed as 100% of the flour component. The results are summarized below:

Comparison of Cookies Made with Coated Cellulose Flour Replacers

|  | viscosity, g | width, cm | length, mm | height, mm | moisture, % |
|---|---|---|---|---|---|
| Climax ® Control | 156.4 | 32.5 | 32.5 | 4.0 | 4.17 |
| Cellulose | 628.0 | 26.4 | 27.8 | 6.5 | 8.18 |
| 20% PE-unground | 262.8 | 28.9 | 29.7 | 5.3 | 6.06 |
| 20% PE-ground | 240.5 | 30.0 | 30.0 | 5.1 | 5.78* |
| 10% PE-ground | 303.0 | 28.7 | 29.5 | 5.6 | 6.36* |
| 5% PE-ground | 374.5 | 27.8 | 28.7 | 5.7 | 7.27* |
| 20% CAB-ground | 200.8 | 31.3 | 31.4 | 4.8 | 5.4* |
| 10% CAB-ground | 263.5 | 30.9 | 30.8 | 5.0 | 5.57* |
| 5% CAB-ground | 310.8 | 29.3 | 29.6 | 5.4 | 6.21* |

*Hot melt

Example 4

This example reports the preparation of several physically coated cellulose flour replacers of the invention prepared using a List® mixer, and illustrates the effect of processing conditions on product characteristics. Different procedures were employed to coat Solka Floc® (SF) cellulose with cellulose acetate butyrate (CAB), ethyl cellulose (EC), and hydroxypropyl methylcellulose (HPMC).

10% CAB-SF. Using mechanical stirring, 133.33 g CAB (Mn 70 k, Aldrich) was dissolved in 3.6 L in a vessel with a Lightnin mixer covered with tin foil to minimize evaporation. Dissolution took about 24 minutes at room temperature.

Twelve hundred g (2.64 IB) of Solka Floc® 300 FCC was weighed into the List mixer, and the above solution was added. The mixer was set for a 30° C. shell temperature and a mixing speed of 60 rpm. After mixing for 20 minutes, a 40 mm Hg vacuum was applied. This condition gave $\Delta T=20°$ C. for evaporation according to the evaporation curve. It took about 80 minutes to dry out the solvent, and the final product moisture was determined to contain 96.54% solids.

Initially there seemed to be extra solvent sufficient for thorough mixing. When the vacuum was applied, the mixture became pasty and viscous. After about 60 minutes, the product broke into lumps about the size of soybeans. When mixing continued under vacuum, the observed lumps began to break apart, and after about another 20 minutes, the vacuum was discontinued, and the product was removed.

The procedure was repeated using the same quantities of materials but with a higher mixing speed. After the CAB dissolution in ethyl acetate, addition of SF, 20 minute mix, and application of vacuum, the mixer was run at a mixing speed of 100 rpm, a 50° C. shell temperature and a vacuum of 10 mm Hg. This gave $\Delta T=45°$ C. for evaporation. Half of the product was removed after 20 minutes; it had a solids content of 92.91%. Mixing of the remainder was continued under vacuum for another 10 minutes, and the final product solids content was 92.13%. The product was similar to the one described above, with some round lumps and chunks coating the wall.

20% CAB-SF. The basic procedure outlined above was repeated using higher levels of CAB. Three hundred g of CAB was completely dissolved in 3.6 L of ethyl acetate in a vessel with a Lightnin® mixer in about 40 minutes. Then 1200 g (2.64 IB) SF 300 was transferred into another List® mixer, and the CAB solution added. The mixture was mixed for 20 minutes before a vacuum was applied. Again, the conditions were 60 rpm mixing speed, 30° C. shell temperature, and 40 mm Hg vacuum to yield $\Delta T=20°$ C. for evaporation. At about 60 minutes, a sample exhibited a solids content of 94.6%. Mixing was continued under vacuum for another 30 minutes, and the final product moisture was 3.0%.

The procedure was repeated using the same quantities of materials but with a higher mixing speed. After the CAB dissolution in ethyl acetate, addition of SF, 20 minute mix, and application of vacuum, the mixer was run at a mixing speed of 100 rpm, a 50° C. shell temperature and a vacuum of 10 mm Hg (though only about 27 mm Hg was achieved). This gave $\Delta T=45°$ C. for evaporation. It took about 15 minutes for the product to reach a solids content of 95.5%. Mixing was continued under vacuum for another 5 minutes, and the final product solids content was 97.47%.

The procedure was repeated at the higher mixing speed and an additional drying step. After 10 minutes of evaporation, half of the product was removed at a solids content of 93.2% and further dried in a vacuum oven overnight. Mixing was then continued under vacuum for another 10 minutes, and the final product solids content was 97.94%.

20% EC-SF. The basic procedure outlined above was repeated using EC (EthoCell® Standard 10, Dow Chemical). Three hundred g of EC was completely dissolved in 3.6 L of ethyl acetate in the same set-up in about 40 minutes. SF, 1200 g (2.64 IB), was weighed into a List mixer, and the EC solution, added. The mixture was mixed for 20 minutes before a vacuum was applied. A mixing speed of 120 rpm, a shell temperature of 40° C., and a 40 mm Hg vacuum yielded ΔT=20° C. for evaporation. At about 70 minutes under vacuum, the product was still very wet. The vacuum was increased to 10 mm Hg and mixing was continued for about 20 minutes to yield a final product solids of 97.75%.

20% HPMC-SF. Three hundred g HPMC (Methocel® E15, Dow Chemical) was dispersed in 1.2 L 90° C. distilled water. An additional 3.6 L distilled water was added at room temperature and the solution mixed carefully to avoid lumps and air bubbles. Twelve hundred g (2.64 IB) of Solka Floc® 300 FCC was weighed into a List mixer, the HPMC solution was added, and the mixture was mixed for 20 minutes. A vacuum was applied, and the mixer was set up at a mixing speed of 100 rpm, a 50° C. shell temperature, and a vacuum of 10 mm Hg (though only about 27 mm Hg was achieved) to give ΔT=40° C. for evaporation. The mixture formed a very viscous dough with a very high torque, so the mixing speed was decreased to 60 rpm. After a pasting period, the dough broke into smaller pieces, and the mixing speed was increased back to 120 rpm.

A similar procedure was repeated using 80% ethanol and 20% water instead of water. Three hundred g HPMC was dispersed in 2.88 L ethanol to which 0.72 L water was added, and the solution was carefully mixed to avoid lumps and air bubbles. Twelve hundred g (2.64 IB) of Solka Floc®300 FCC was weighed into a Vessel with a Lightnin® mixer, the HPMC solution was added, and the mixture was mixed for 20 minutes before a vacuum was applied. The mixer was set up at a mixing speed of 60 rpm, a 50° C. shell temperature, and a vacuum of 10 mm Hg (though only about 27 mm Hg was achieved) to give ΔT=60° C. for evaporation. After the pasting period, the dough broke into smaller pieces, and the mixing speed was increased to 120 rpm.

The product was not yellowish, but harder, rougher, and less smooth than the CAB coating.

Example 5

This example compares and contrasts cookies made using the coated cellulose products of Example 4 as a 25% flour replacement in cookie recipe set out in Example 3. All experiments were conducted using Climax® flour controls, which produced cookies exhibiting a standard width, length, height, and final moisture content.

CAB-SF. Use of the 10% CAB-SF 300 product produced a dough that was dry and hard, and cracked when sheeted. The viscosity was 672 g, whereas the control exhibited a viscosity of 129. After baking, the cookies had a smaller spread (exhibiting a diameter of 28 mm versus 34 mm, and a height of 6.9 mm versus 3.8 mm in comparison to the control) and a higher final product moisture (10.45% versus 4.7%).

At 10% CAB coating levels, evaporation conditions did not contribute significantly to the coating efficiency in terms of baking functionality. As shown from the data below, the cookies exhibited similar spread, dough viscosity, and final product moisture. However, cookies prepared with material prepared under higher evaporation conditions exhibited slightly better functionality.

|  | viscosity, g | width, cm | length, mm | height, mm | moisture, % |
| --- | --- | --- | --- | --- | --- |
| Climax ® Control | 129 | 33.6 | 33.6 | 3.8 | 4.71 |
| 10% CAB-SF, 60 rpm | 672 | 27.7 | 28.5 | 6.9 | 10.45 |
| 10% CAB-SF, 100 rpm | 521 | 28.4 | 29.7 | 5.6 | 8.35 |
| 10% Example 1 CAB-SF | 849 | 26.0 | 25.9 | 7.0 | 8.59 |

Though the three 20% CAB-SF products produced as described in Example 4 were prepared under different evaporation, temperature and time conditions, significant variations in the performance and functionality were not observed when the flour replacers were employed in the cookie recipe. The cookies baked with the three differently treated fibers yielded similar spread, dough viscosity, and final product moisture values. The results may be summarized as follows:

|  | viscosity, g | width, cm | length, mm | height, mm | moisture, % |
| --- | --- | --- | --- | --- | --- |
| Climax ® Control | 129 | 33.6 | 33.6 | 3.8 | 4.71 |
| 20% CAB-SF, 60 rpm | 356 | 30.5 | 31.1 | 5.0 | 7.5 |
| 20% CAB-SF, 100 rpm/dry | 388 | 31.9 | 32.1 | 5.4 | 8.61 |
| 20% CAB-SF, 100 rpm | 382 | 31.3 | 31.8 | 4.9 | 6.77 |
| 20% Example 1 CAB-SF | 237 | 34.1 | 34.5 | 4.0 | 5.40 |

The data show no significant differences between coatings prepared under low and high evaporation coating conditions in terms of the baking functionality of the coated fiber. Also, samples vacuum dried overnight instead of completely dried in the vessel with a Lightnin mixer performed similarly.

The data above also shows that 20% CAB-coated cellulose performed better in cookies at 25% flour replacement level compared to 10% CAB coatings. The cookies had greater spread (exhibiting a diameter of 32 mm vs. 28 mm and a height of 5.4 mm vs. 6.9 mm) and a lower final cookie moisture (8.6% vs. 10.45%)

20% EC-SF. The ethyl cellulose coated Solka Floc® flour replacer improves fiber functionality. Compared to the CAB coating of Example 1, the baking results are similar, but the EC coating gave lower dough viscosity. The results are tabulated below:

|  | viscosity, g | width, cm | length, mm | height, mm | moisture, % |
| --- | --- | --- | --- | --- | --- |
| Climax ® Control | 129 | 33.6 | 33.6 | 3.8 | 4.71 |
| 20% CAB-SF, 60 rpm | 356 | 30.5 | 31.1 | 5.0 | 7.04 |
| 20% EC-SF, 120 rpm | 268 | 30.2 | 30.8 | 5.2 | 6.89 |
| 20% Example 1 CAB-SF | 237 | 34.1 | 34.5 | 4.0 | 5.40 |

20% HPMC-SF. The hydroxypropyl methylcellulose coating prepared using a List mixer produced a flour replacement exhibiting good baking functionality. The cookie spreads more than the coated fibers described above, but close to the Climax® control. Dough viscosity decreased significantly. Comparative data are set out below.

|  | viscosity, g | width, cm | length, mm | height, mm | moisture, % |
| --- | --- | --- | --- | --- | --- |
| Climax ® Control | 129 | 33.6 | 33.6 | 3.8 | 4.71 |
| 20% CAB-SF, 60 rpm | 356 | 30.5 | 31.1 | 5.0 | 7.04 |
| 20% EC-SF, 120 rpm | 268 | 30.2 | 30.8 | 5.2 | 6.89 |
| 20% HPMC-SF | 242 | 32.5 | 33.0 | 4.0 | 6.13 |
| 20% Example 1 CAB-SF | 237 | 34.1 | 34.5 | 4.0 | 5.40 |

Example 6

This example reports further data that show how a substitution of 25% of the flour in the cookie recipe of Example 3 with various coated cellulose and other flour replacers can effect dough viscosity, cookie geometry, and product moisture. The experiments tested several factors including coating selection, the amount of coating applied, evaporation during the coating procedure, solvent effects (if solvents were employed to dissolve the coating), coating molecular weight effects, the effect of different substrates, and the like.

For comparison purposes, cellulose acetate butyrate (CAB) was employed as a 25% flour replacement at levels of 2.5%, 5%, 10%, and 20% in the cookie recipe of Example 3. The results are plotted in FIG. 1. It can be seen from the data that replacement of flour with CAB at increasing levels yielded doughs of lower viscosity, larger spread, and lower final moisture.

Figure 2:
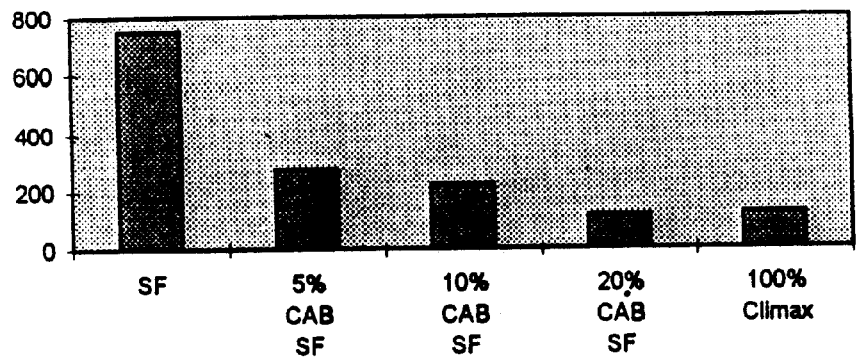
FIG. 2 is a bar graph presenting data related to dough viscosity, cookie geometry, and product moisture content observed in cookies prepared using Solka Floc® cellulose coated with cellulose acetate butyrate at different levels as a partial flour replacement.
Figure 2:
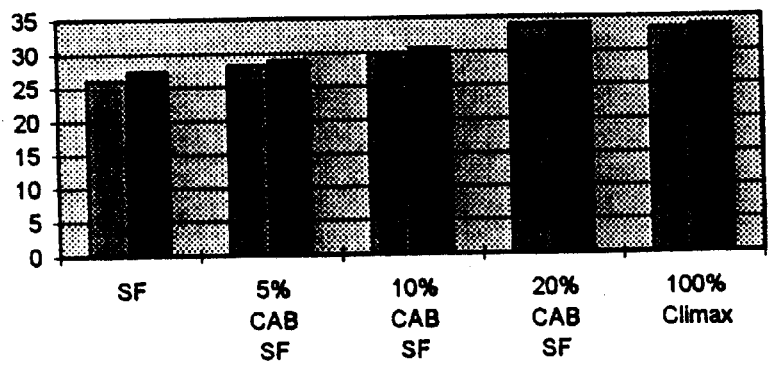
Figure 2:
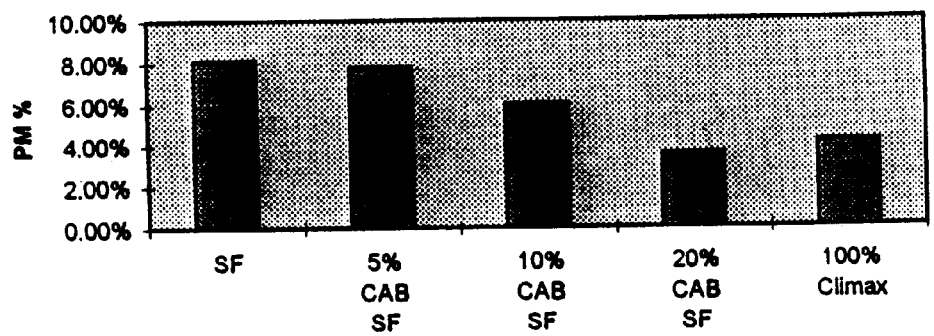

Various levels of cellulose acetate butyrate (CAB) were employed to coat Solka Floc® cellulose as described in Example 1. SF samples containing 5% CAB, 10% CAB, and 20% CAB were prepared. The flour replacements were employed in the cookie recipe of Example 3, and compared with 0% CAB (i.e., pure SF as a 25% flour replacement) and a Climax® control flour. The results are given in FIG. 2. The data show that increasing the CAB level decreased cookie viscosity, increased cookie spread, and decreased final cookie moisture.

Figure 3:
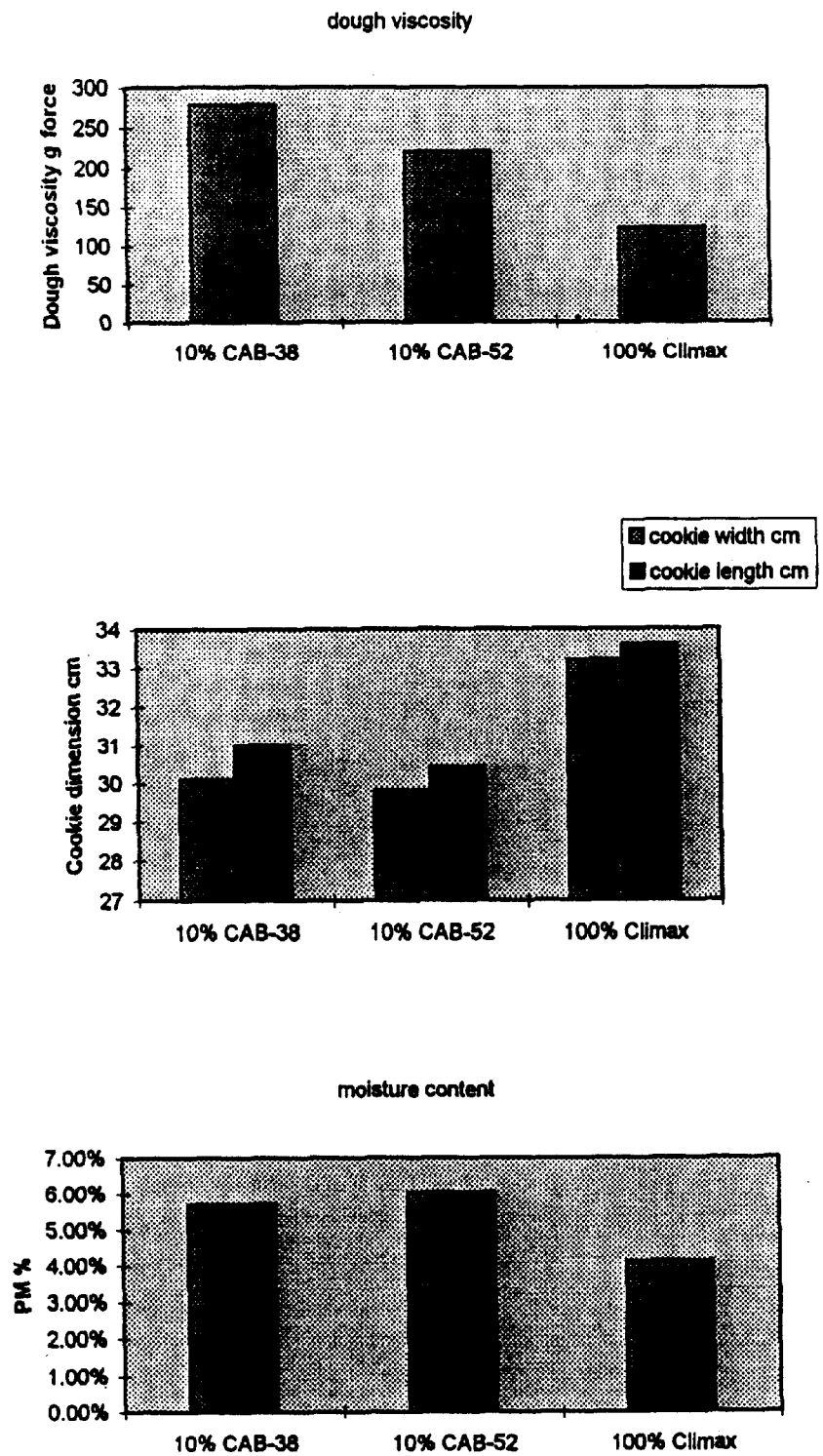
FIG. 3 is a bar graph presenting data related to dough viscosity, cookie geometry, and product moisture content observed in cookies prepared using, as a partial replacement of the flour component, cellulose coated with cellulose acetate butyrates having different butyl contents.

Two CAB preparations, one containing 38% butyl and the other, 52%, were employed to coat SF at a 10% level as set out in Example 1. Cookies made with these materials using the recipe of Example 3 were compared with cookies made using SF and Climax® flour. Cookies having a higher butyl content in the CAB coating exhibited a lower dough viscosity, but cookie spread was similar. The results are shown in FIG. 3.

Figure 4:
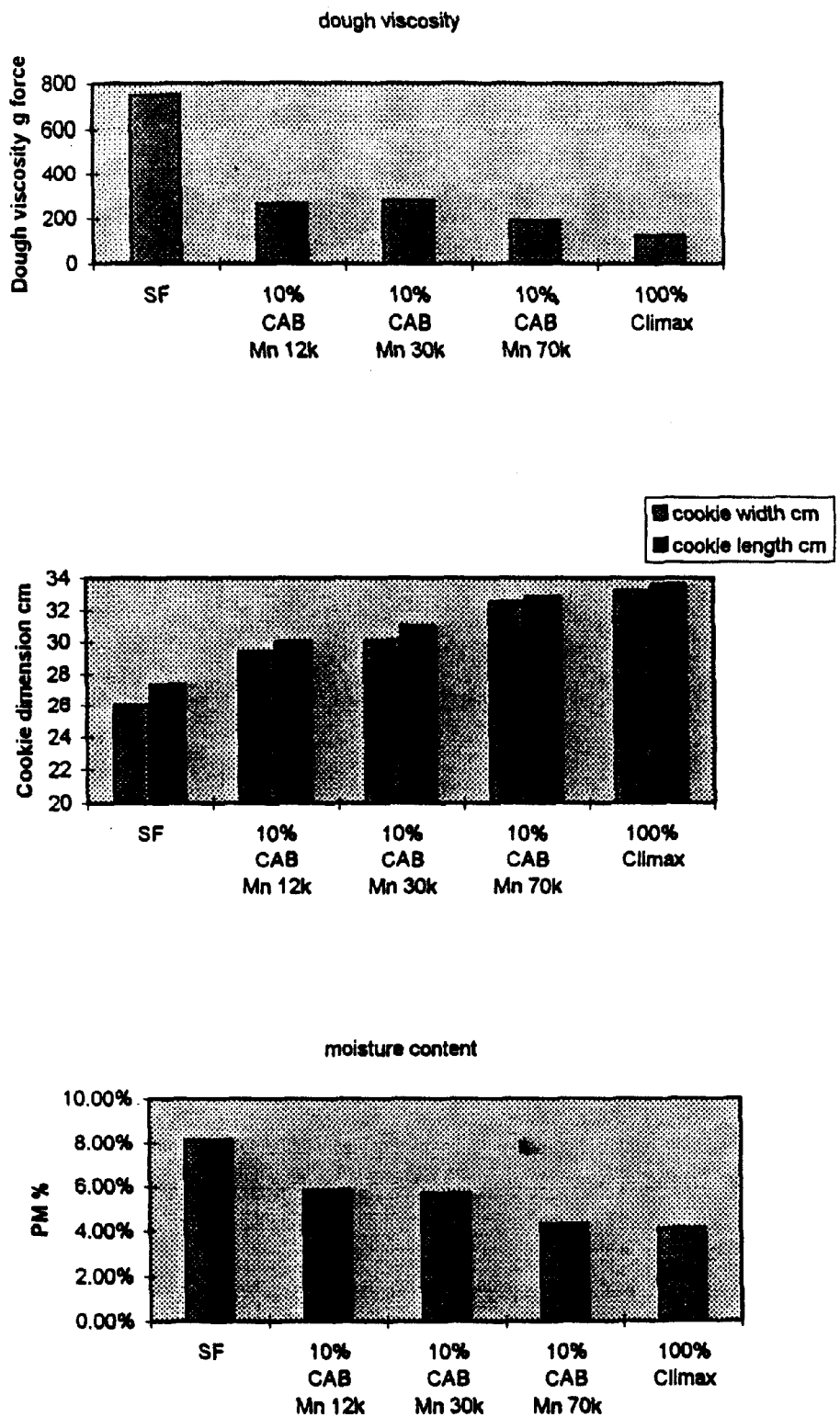
FIG. 4 is a bar graph presenting data related to dough viscosity, cookie geometry, and product moisture content observed in cookies prepared using, as a partial replacement of the flour component, cellulose coated with cellulose acetate butyrates having different molecular weights.

Three CAB preparations having average molecular weights of 12,000, 30,000, and 70,000, respectively, were used to coat SF at a 10% level as set out in Example 1. The CAB samples used in the experiment had the same butyl content, about 30%. Cookies made with these materials using the recipe of Example 3 were compared with cookies using SF and Climax® flour. The results are represented in the bar graphs of FIG. 4. At the same coating level, CABs having a higher molecular weight produced doughs of lower viscosity and cookies having larger spread and lower product moisture.

Figure 5:
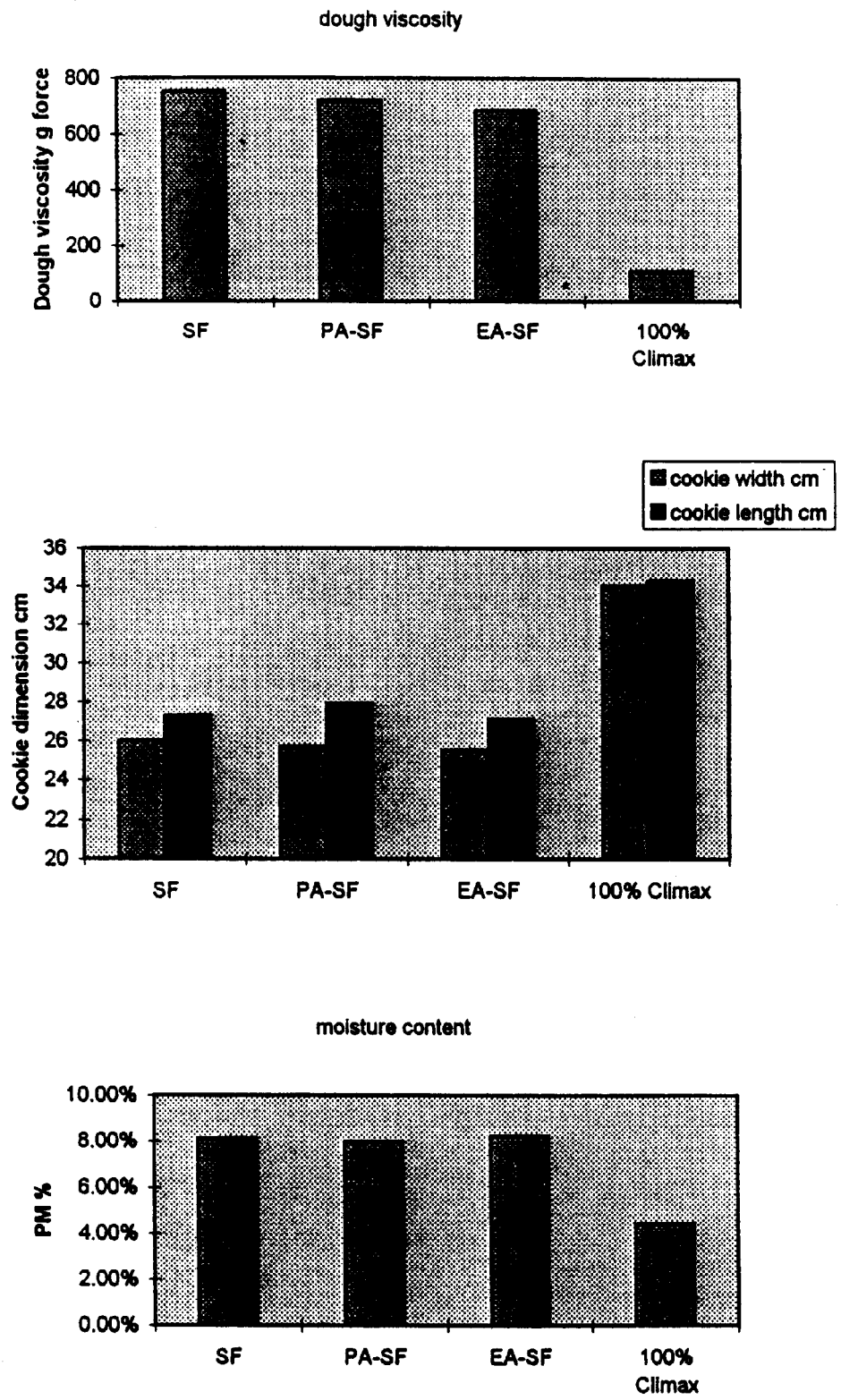
FIG. 5 is a bar graph presenting data related to dough viscosity, cookie geometry, and product moisture content observed in cookies prepared using, as a partial replacement of the flour component, cellulose treated with several different solvents (i.e., solvent controls).

FIG. 5 illustrates some solvent effects on coatings. Solka-Floc® was treated with either ethyl acetate or propyl acetate as set out in Example 1, and cookies prepared with these materials were compared with SF and Climax®. It can be seen that solvent treatment of cellulose without polymer coating did not significantly change the cellulose properties, as the cookies baked with solvent-treated cellulose did not vary with cookies baked with pure cellulose.

Figure 6:
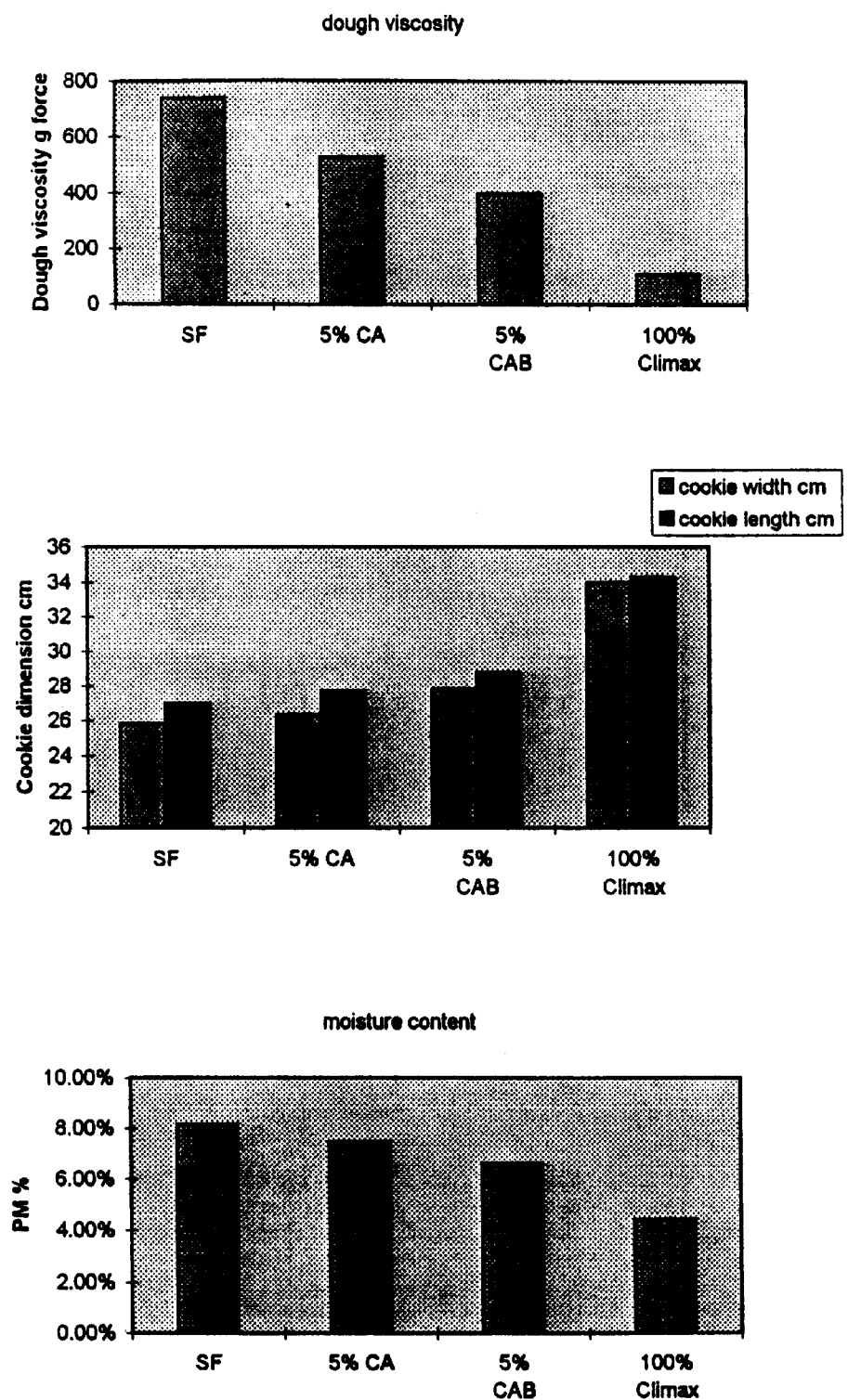
FIG. 6 is a bar graph comparing data related to dough viscosity, cookie geometry, and product moisture content observed in cookies prepared using cellulose coated with cellulose acetate and cellulose coated with cellulose acetate butyrate in partial replacement of the flour component.

The characteristics of cookies made using SF coated at a 5% level with cellulose acetate (CA) was compared with SF coated with the same level of CAB. The results are plotted in FIG. 6. The CAB cookies were superior, exhibiting a lower dough viscosity, larger spread and lower final cookie moisture.

Figure 7:
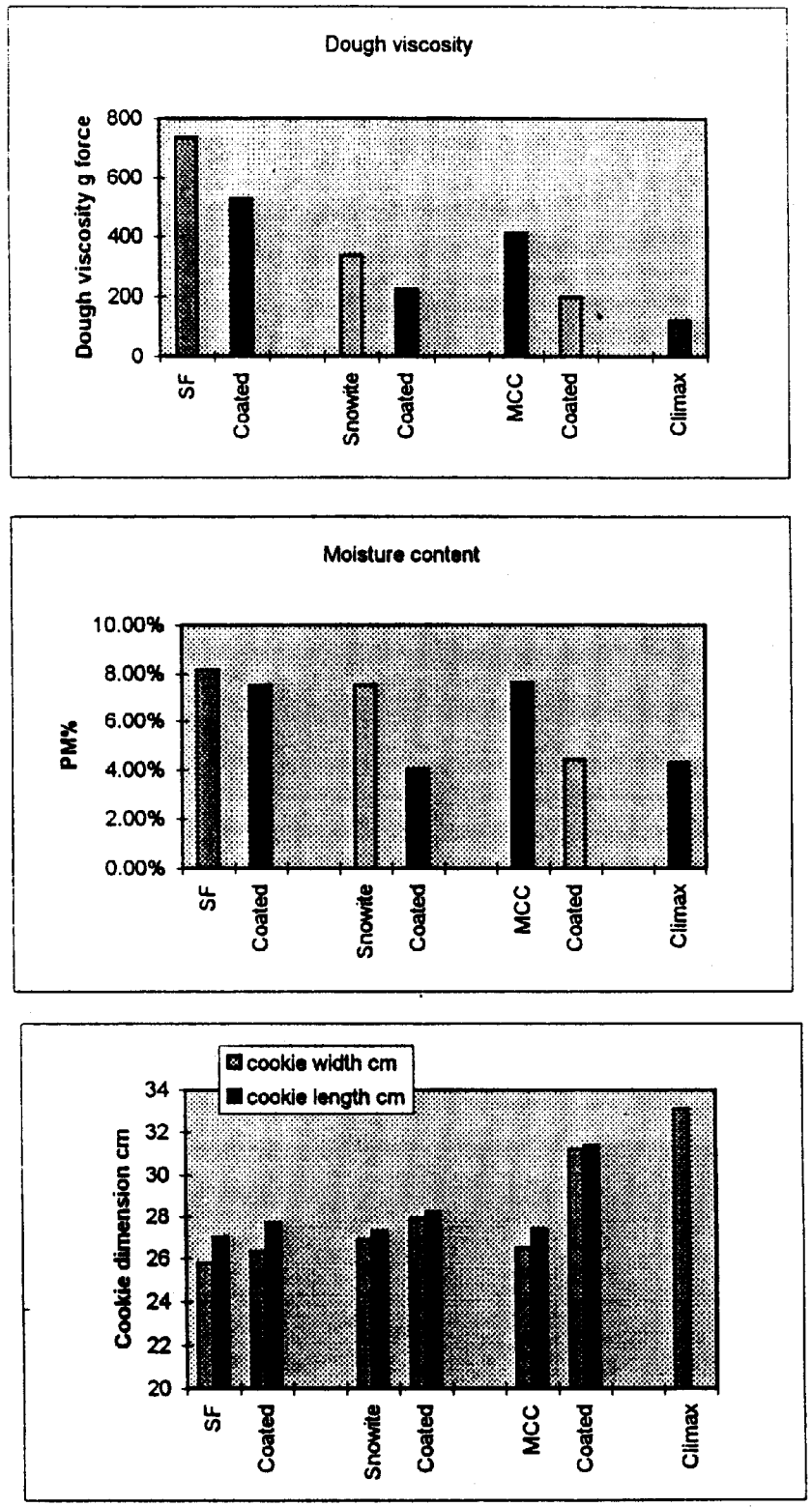
FIG. 7 is a bar graph presenting comparative data related to dough viscosity, cookie geometry, and product moisture content observed in cookies prepared using different cellulosic materials coated with cellulose acetate in partial replacement of the flour replacement.

Cookies prepared with SF coated at a 10% level with CAB having a molecular weight of 70,000 were compared with cookies prepared with SF coated at the same level with hydroxypropyl methylcellulose. Using this process, the two polymers did not show significant differences in the coated cellulose as applied at the 25% flour replacement level in cookies. The results are shown in FIG. 7.

Comparisons were made between CAB-SF coatings using different fiber sizes. The 20% CAB coating procedure for Solka Floc® 300 set out in Example 4 was repeated using Solka Floc® 200. It can be seen from the data below, that cookies prepared with this flour replacement produced were superior to the Climax® control in terms of spread, dough viscosity, and lower final moisture content. Coated SF 200 in this process showed better functionality than the coated SF 300 in cookie baking.

|  | viscosity, g | width, cm | length, mm | height, mm | moisture, % |
| --- | --- | --- | --- | --- | --- |
| Climax ® Control | 129 | 33.6 | 33.6 | 3.8 | 4.71 |
| 20% CAB-SF 300 | 237 | 34.1 | 34.5 | 4.0 | 5.40 |
| 20% CAB-SF 200 | 145 | 36.9 | 36.8 | 3.5 | 3.79 |

Example 7

This example reports an experiment in which white wheat fiber (Watson, Conn.) was coated with zein (G-10) to produce a physically coated cellulosic material containing 10% zein. The coated cellulose was incorporated into a standard cookie formulation to an extent that the final product contained 2.5 g total dietary fiber per serving of cookies. The results showed that dough consistency had improved, LFRA texture values dropped, and the spread factor (diameter to height ratio) increased when the fiber was coated with zein.

The papers and patents cited above are hereby incorporated herein in their entireties by reference.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are meant to cover the claimed components and steps in any sequence which is effective to meet the objectives there intended, unless the context specifically indicates the contrary.

We claim:

1. A method for reducing calories in an edible composition having a carbohydrate ingredient comprising replacing at least a portion of the carbohydrate ingredient with a flour replacement prepared by the process of physically coating a particulate cellulosic material with an edible hydrophobic polymer by blending the cellulosic material with the polymer at an elevated temperature.

2. A method according to claim 1, wherein the cellulosic material is selected from the group consisting of α-cellulose, microcrystalline cellulose, methyl cellulose, wheat fiber and cellulose acylated with $C_2$ to $C_{24}$ aliphatic acids, wherein at least about 50% of the cellulose exhibit a degree of substitution of about 0.05 or less, oat fiber, bran, grain milling fractions high in cellulose, and mixtures thereof.

3. A method according to claim 2, wherein the cellulosic material comprises bran selected from the group consisting of rice bran, wheat bran, barley bran, oat bran, corn bran, bran from legumes such as beans and peas, and combinations.

4. A method according to claim 2, wherein the cellulosic material comprises microcrystalline cellulose or α-cellulose.

5. A method according to claim 2, wherein the cellulosic material is cellulose acylated with $C_2$ to $C_{24}$ aliphatic acids, wherein at least about 50% of the cellulose exhibit a degree of substitution of about 0.05 or less.

6. A method according to claim 1, wherein the hydrophobic polymer comprises a member selected from the group consisting of cellulose esters, cellulose ethers, natural waxes, petroleum waxes, proteins, and mixtures thereof.

7. A method according to claim 6, wherein the polymer comprises a cellulose ester of one or more $C_2$ to $C_{24}$ aliphatic acids.

8. A method according to claim 6, wherein the polymer comprises a cellulose ether selected from the group consisting of methyl cellulose, ethyl cellulose, hydroxypropyl methyl cellulose, and mixtures.

9. A method according to claim 6, wherein the hydrophobic polymer is selected from the group consisting of polyethylene and zein.

10. A food product prepared according to the method of claim 1, which is a crisp baked product selected from the group consisting of cookies, biscuits and crackers.

11. A food composition comprising flour and noncarbohydrate ingredients wherein at least a portion of the flour is replaced by a low calorie flour replacement comprising particulate cellulosic material, physically coated with an edible hydrophobic polymer.

12. A composition according to claim 11, wherein the cellulosic material is selected from the group consisting of α-cellulose, microcrystalline cellulose, methyl cellulose, wheat fiber and cellulose acylated with $C_2$ to $C_{24}$ aliphatic acids, wherein at least about 50% of the cellulose exhibit a degree of substitution of about 0.05 or less, oat fiber, bran, grain milling fractions high in cellulose, and mixtures thereof.

13. A composition according to claim 11, wherein the cellulosic material is cellulose acylated with $C_2$ to $C_{24}$ aliphatic acids to a degree of substitution of about 0.05 or less.

14. A composition according to claim 11, wherein the hydrophobic polymer comprises a member selected from the group consisting of cellulose esters, cellulose ethers, natural waxes, petroleum waxes, proteins, and mixtures thereof.

15. A composition according to claim 14, wherein the polymer comprises a cellulose ester of one or more $C_2$ to $C_{24}$ aliphatic acids.

16. A composition according to claim 15, wherein the cellulose ester is cellulose acetate butyrate.

17. A composition according to claim 15, wherein the polymer comprises a cellulose ether selected from the group consisting of methyl cellulose, ethyl cellulose, hydroxypropyl methyl cellulose, and mixtures.

18. A composition according to claim 11, wherein at least about 25% of the flour is replaced.

19. A composition according to claim 11, which is a crisp, baked product.

20. A process for preparing a low calorie flour replacement comprising the steps of
(a) heating an edible hydrophobic polymer to a temperature sufficient to liquefy the polymer;
(b) adding a particulate cellulosic material to the liquefied polymer;
(c) agitating in the absence of emulsifiers for a time and under conditions sufficient to physically coat the particulate material; and
(d) solidifying the polymer to provide a coated material.

21. A process according to claim 20, wherein the cellulosic material is selected from the group consisting of α-cellulose, microcrystalline cellulose, methyl cellulose, wheat fiber and cellulose acylated with $C_2$ to $C_{24}$ aliphatic acids, wherein at least about 50% of the cellulose exhibit a degree of substitution of about 0.05 or less, oat fiber, bran, grain milling fractions high in cellulose, and mixtures thereof.

22. A process according to claim 20, wherein the cellulosic material comprises microcrystalline cellulose or α-cellulose.

23. A process according to claim 20, wherein the cellulosic material comprises cellulose acylated with $C_2$ to $C_{24}$ aliphatic acids to a degree of substitution of about 0.05 or less.

24. A process according to claim 20 wherein the hydrophobic polymer has a flow point above about 50° C. up to about 180° C.

25. A process according to claim 20, wherein the hydrophobic polymer comprises a member selected from the group consisting of cellulose esters, cellulose ethers, natural waxes, petroleum waxes, proteins, and mixtures thereof.

26. A process according to claim 25, wherein the polymer comprises a cellulose ester of one or more $C_2$ to $C_{24}$ aliphatic acids.

27. A process according to claim 26, wherein the polymer comprises a cellulose ether selected from the group consisting of methyl cellulose, ethyl cellulose, hydroxypropyl methyl cellulose, and mixtures.

28. A process according to claim 26, wherein the hydrophobic polymer comprises hydroxypropyl methyl cellulose or cellulose acetate butyrate.

29. A low calorie flour replacement comprising α-cellulose physically coated with cellulose acetate butyrate.

30. A low calorie flour replacement comprising α-cellulose physically coated with hydroxypropyl methylcellulose.

31. A low calorie flour replacement comprising cellulose acylated with $C_2$ to $C_{24}$ aliphatic acids to a degree of substitution of about 0.05 or less physically coated with an edible hydrophobic polymer.

32. A flour replacement according to claim 31 wherein at least about 60% of the acids are $C_{16}$ to $C_{20}$ acids.

33. A flour replacement according to claim 31 wherein the hydrophobic polymer flows at a temperature within the range of about 50° to about 180° C.

34. A flour replacement according to claim 31, wherein the hydrophobic polymer the hydrophobic polymer comprises a member selected from the group consisting of cellulose esters, cellulose ethers, natural waxes, petroleum waxes, proteins, and mixtures thereof.

35. A flour replacement according to claim 34 wherein the hydrophobic polymer is a cellulose ester of one or more $C_2$ to $C_{24}$ aliphatic acids.

36. A flour replacement according to claim 32 wherein the hydrophobic polymer is selected from the group consisting of polyethylene, zein, and mixtures thereof.

* * * * *

UNITED STATES PATENT AND TRADEMARK OFFICE
CERTIFICATE OF CORRECTION

PATENT NO. : 5,976,598
DATED : November 2, 1999
INVENTOR(S) : Daniel Akkaway et al.

It is certified that error appears in the above-indentified patent and that said Letters Patent is hereby corrected as shown below:

cover page, column 1 [75], line 7

Correct inventor's name to read Haresh P. Madeka.

Signed and Sealed this

Third Day of April, 2001

Attest:

NICHOLAS P. GODICI

Attesting Officer

Acting Director of the United States Patent and Trademark Office